(12) United States Patent
Willis et al.

(10) Patent No.: US 8,372,269 B2
(45) Date of Patent: Feb. 12, 2013

(54) HEAVY METALS TRAPPING CO-CATALYST FOR FCC PROCESSES

(75) Inventors: Mitchell James Willis, Bainbridge, GA (US); Kenneth Warren Folmar, Macon, GA (US)

(73) Assignee: BASF Corporation, Florham Park, NJ (US)

( * ) Notice: Subject to any disclaimer, the term of this patent is extended or adjusted under 35 U.S.C. 154(b) by 672 days.

(21) Appl. No.: 12/572,777

(22) Filed: Oct. 2, 2009

(65) Prior Publication Data

US 2011/0079543 A1    Apr. 7, 2011

(51) Int. Cl.
*C10G 11/04*    (2006.01)
(52) U.S. Cl. .......... 208/119; 502/84; 502/340; 208/113; 208/118; 208/121
(58) Field of Classification Search .................... 502/84, 502/340; 208/113, 118–119, 121
See application file for complete search history.

(56) References Cited

U.S. PATENT DOCUMENTS

| | | | |
|---|---|---|---|
| 3,537,816 A | 11/1970 | Moscou | |
| 3,699,037 A | 10/1972 | Annesser et al. | |
| 4,439,312 A | 3/1984 | Asaoka et al. | |
| 4,451,355 A | 5/1984 | Mitchell et al. | |
| 4,465,779 A | 8/1984 | Occelli et al. | |
| 4,493,902 A | 1/1985 | Brown et al. | |
| 4,515,903 A | 5/1985 | Otterstedt et al. | |
| 4,549,548 A | 10/1985 | Wittkampf et al. | |
| 4,707,461 A | 11/1987 | Mitchell et al. | |
| 4,920,087 A | 4/1990 | Wormsbecher | |
| 4,929,338 A | 5/1990 | Wormsbecher | |
| 4,944,865 A | 7/1990 | Occelli et al. | |
| 4,988,654 A | 1/1991 | Kennedy et al. | |
| 5,002,653 A | 3/1991 | Kennedy et al. | |
| 5,023,220 A | 6/1991 | Dight et al. | |
| 5,260,240 A | 11/1993 | Guthrie et al. | |
| 5,300,469 A | 4/1994 | Deeba et al. | |
| 5,384,041 A | 1/1995 | Deeba et al. | |
| 5,858,208 A | 1/1999 | Flanders et al. | |
| 5,964,906 A | 10/1999 | Layrisse et al. | |
| 5,965,474 A | 10/1999 | Balko et al. | |
| 6,589,902 B1 | 7/2003 | Stamires et al. | |
| 6,696,378 B2 * | 2/2004 | Gibson et al. | ................... 502/79 |
| 6,916,762 B2 | 7/2005 | Shibuya et al. | |
| 7,361,264 B2 | 4/2008 | Vierheilig | |
| 7,361,319 B2 | 4/2008 | Vierheilig | |
| 2003/0136707 A1 | 7/2003 | Harris et al. | |
| 2004/0029717 A1 | 2/2004 | O'Connor et al. | |
| 2004/0256290 A1 | 12/2004 | Yamada et al. | |
| 2006/0027485 A1 | 2/2006 | Vierheilig | |
| 2011/0132808 A1 * | 6/2011 | Fu et al. | ........................ 208/253 |

FOREIGN PATENT DOCUMENTS

| | | |
|---|---|---|
| EP | 0208798 | 7/1985 |
| EP | 0189267 | 1/1986 |
| EP | 0568170 | 4/1993 |
| WO | WO8200105 | 1/1982 |

* cited by examiner

*Primary Examiner* — Brian McCaig
(74) *Attorney, Agent, or Firm* — Bernard Lau

(57) ABSTRACT

A metal trap particle used for passivation of metals during FCC cracking comprises a calcined spray dried particle formed from kaolin, magnesium oxide or magnesium hydroxide and calcium carbonate. The metal trap particle contains at least 10 wt. % magnesium oxide which improves metals passivation during FCC cracking.

20 Claims, 1 Drawing Sheet

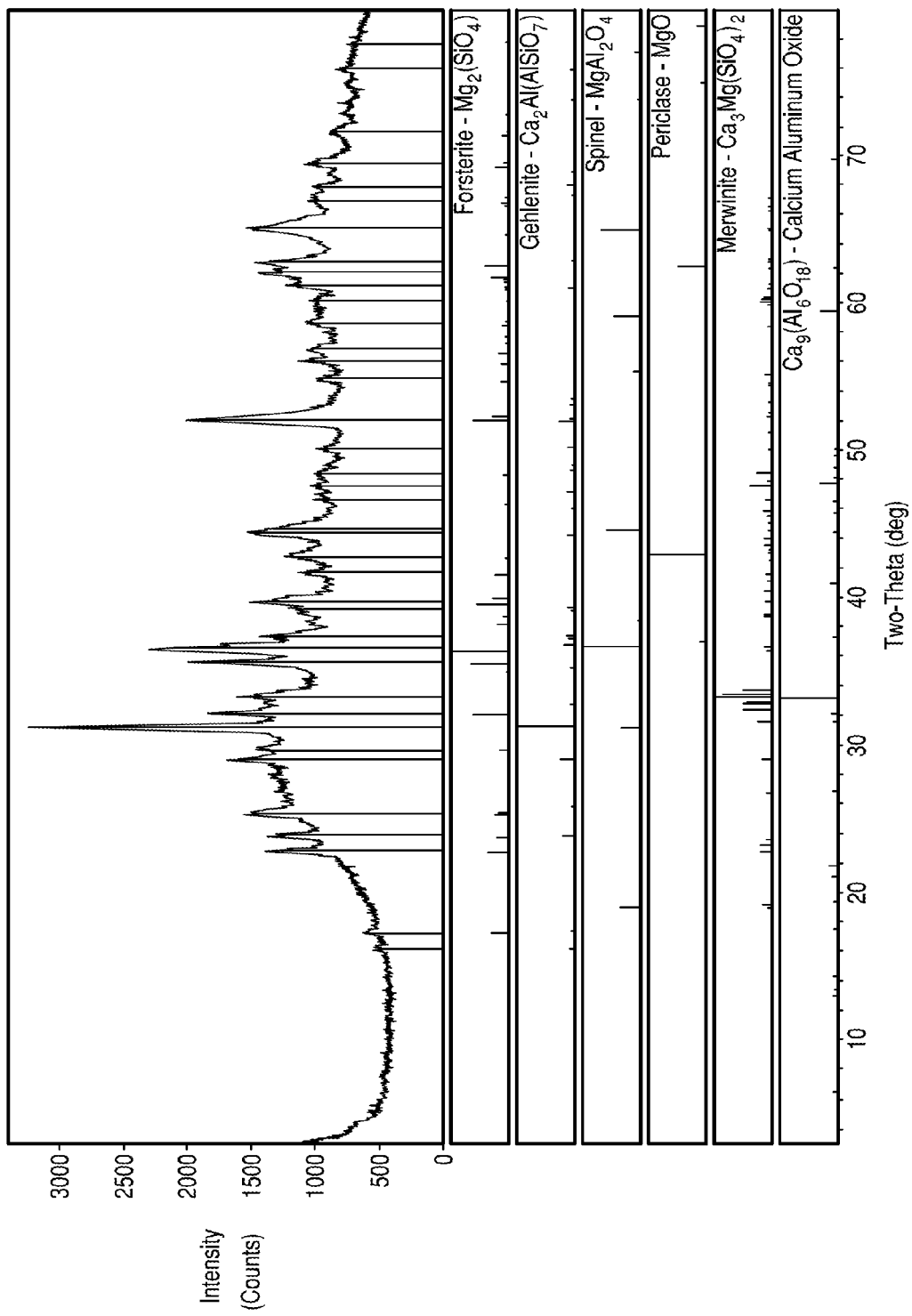

HEAVY METALS TRAPPING CO-CATALYST FOR FCC PROCESSES

FIELD OF THE INVENTION

The present invention provides methods of mitigating the deleterious effect of metals on catalytic cracking of hydrocarbon feedstocks. This objective is achieved through the use of a novel mixed metal oxide additive which acts to trap metals.

BACKGROUND OF THE INVENTION

Catalytic cracking is a petroleum refining process that is applied commercially on a very large scale. A majority of the refinery gasoline blending pool in the United States is produced by this process, with almost all being produced using the fluid catalytic cracking (FCC) process. In the FCC process, heavy hydrocarbon fractions are converted into lighter products by reactions taking place at high temperatures in the presence of a catalyst, with the majority of the conversion or cracking occurring in the gas phase. The FCC hydrocarbon feedstock (feedstock) is thereby converted into gasoline and other liquid cracking products as well as lighter gaseous cracking products of four or fewer carbon atoms per molecule. These products, liquid and gas, consist of saturated and unsaturated hydrocarbons.

In FCC processes, feedstock is injected into the riser section of a FCC reactor, where the feedstock is cracked into lighter, more valuable products upon contacting hot catalyst circulated to the riser-reactor from a catalyst regenerator. As the endothermic cracking reactions take place, carbon is deposited onto the catalyst. This carbon, known as coke, reduces the activity of the catalyst and the catalyst must be regenerated to revive its activity. The catalyst and hydrocarbon vapors are carried up the riser to the disengagement section of the FCC reactor, where they are separated. Subsequently, the catalyst flows into a stripping section, where the hydrocarbon vapors entrained with the catalyst are stripped by steam injection. Following removal of occluded hydrocarbons from the spent cracking catalyst, the stripped catalyst flows through a spent catalyst standpipe and into a catalyst regenerator.

Typically, catalyst is regenerated by introducing air into the regenerator and burning off the coke to restore catalyst activity. These coke combustion reactions are highly exothermic and as a result, heat the catalyst. The hot, reactivated catalyst flows through the regenerated catalyst standpipe back to the riser to complete the catalyst cycle. The coke combustion exhaust gas stream rises to the top of the regenerator and leaves the regenerator through the regenerator flue. The exhaust gas generally contains nitrogen oxides (NOx), sulfur oxides (SOx), carbon monoxide (CO), oxygen ($O_2$), ammonia, nitrogen and carbon dioxide ($CO_2$).

The three characteristic steps of the FCC process that the cracking catalyst undergoes can therefore be distinguished: 1) a cracking step in which feedstock is converted into lighter products, 2) a stripping step to remove hydrocarbons adsorbed on the catalyst, and 3) a regeneration step to burn off coke deposited on the catalyst. The regenerated catalyst is then reused in the cracking step.

A major breakthrough in FCC catalysts came in the early 1960's, with the introduction of molecular sieves or zeolites. These materials were incorporated into the matrix of amorphous and/or amorphous/kaolin materials constituting the FCC catalysts of that time. These new zeolitic catalysts, containing a crystalline aluminosilicate zeolite in an amorphous or amorphous/kaolin matrix of silica, alumina, silica-alumina, kaolin, clay or the like were at least 1,000-10,000 times more active for cracking hydrocarbons than the earlier amorphous or amorphous/kaolin containing silica-alumina catalysts. This introduction of zeolitic cracking catalysts revolutionized the fluid catalytic cracking process. New processes were developed to handle these high activities, such as riser cracking, shortened contact times, new regeneration processes, new improved zeolitic catalyst developments, and the like.

The new catalyst developments revolved around the development of various zeolites such as synthetic types X and Y and naturally occurring faujasites; increased thermal-steam (hydrothermal) stability of zeolites through the inclusion of rare earth ions or ammonium ions via ion-exchange techniques; and the development of more attrition resistant matrices for supporting the zeolites. The zeolitic catalyst developments gave the petroleum industry the capability of greatly increasing throughput of feedstock with increased conversion and selectivity while employing the same units without expansion and without requiring new unit construction.

After the introduction of zeolite containing catalysts the petroleum industry began to suffer from a lack of crude availability as to quantity and quality accompanied by increasing demand for gasoline with increasing octane values. The world crude supply picture changed dramatically in the late 1960's and early 1970's. From a surplus of light-sweet crudes the supply situation changed to a tighter supply with an ever increasing amount of heavier crudes with higher sulfur contents. These heavier and high sulfur crudes presented processing problems to the petroleum refiner in that these heavier crudes invariably also contained much higher metals with accompanying significantly increased asphaltic content.

The effects of metals such as Ni—V—Na present in the feedstock and/or deposited on the catalyst during processing of the feedstock have been described in the literature as to their highly unfavorable effect in lowering catalyst activity and selectivity for gasoline production and their equally harmful effect on catalyst life. In particular, vanadium, at high concentrations in the feed, is especially detrimental to catalyst life. Accordingly, the presence of metal contaminants in the feedstock presents a serious problem during FCC processing. Common metal contaminants are iron (Fe), nickel (Ni), sodium (Na), and vanadium (V). Some of these metals may promote dehydrogenation reactions during the cracking sequence and result in increased amounts of coke and light gases at the expense of gasoline production. Some of these metals may also have a detrimental effect on the cracking catalyst stability and crystallinity. During the cracking catalyst regeneration process, metals present in the catalyst itself may volatilize under the hydrothermal conditions and re-deposit on the catalyst. Silicon (Si) is an example of such a metal. All of these metals, whether initially present in the feedstock, the cracking catalyst, or some other compound present in the FCC reactor, may lead to loss of activity, selectivity, stability, and crystallinity of the active component of the cracking catalyst.

As previously noted, vanadium poisons the cracking catalyst and reduces its activity. The literature in this field has reported that vanadium compounds present in feedstock become incorporated in the coke which is deposited on the cracking catalyst and is then oxidized to vanadium pentoxide in the regenerator as the coke is burned off. One possible pathway by which vanadium reduces catalyst activity involves vanadium pentoxide reacting with water vapor present in the regenerator to form vanadic acid. Vanadic acid may then react with the zeolite catalyst, destroying its crystallinity and reducing its activity.

Because compounds containing vanadium and other metals cannot, in general, be readily removed from the cracking unit as volatile compounds, the usual approach has been to passivate these compounds under conditions encountered during the cracking process. Passivation may involve incorporating additives into the cracking catalyst or adding separate additive particles along with the cracking catalyst. These additives combine with the metals and therefore act as "traps" or "sinks" so that the active component of the cracking catalyst is protected. The metal contaminants are removed along with the catalyst withdrawn from the system during its normal operation and fresh metal trap is added with makeup catalyst so as to effect a continuous withdrawal of the detrimental metal contaminants during operation. Depending upon the level of the harmful metals in the feedstock, the quantity of additive may be varied relative to the makeup catalyst in order to achieve the desired degree of metals passivation.

Patents including disclosure of the use of alkaline earth compounds, including magnesium oxide, to mitigate the effects of vanadium include U.S. Pat. No. 4,465,779, U.S. Pat. No. 4,549,548; U.S. Pat. No. 4,944,865; U.S. Pat. No. 5,300,469; U.S. Pat. No. 7,361,264; WO 82/00105; GB 218314A; EP-A-020151 and EP-A-0189267. In some of these references, the magnesium oxide is contained in discrete particles, separate from the particles of zeolite cracking catalyst.

Efforts to develop products and processing modifications to mitigate vanadium passivation are by no means limited to the use of alkaline earth material. Certain perovskites such as barium titanate are employed commercially. Perovskites are expensive. Perovskites are not considered to be very effective in reducing SOX emissions in regenerator flue gas. Alkaline earth material, especially magnesium oxide, offers the additional benefit of reducing SOx in regenerator flue gas from cracking units. See, for example, WO 82/00105 (supra).

There is strong motivation to utilize the inherent vanadium binding and SOx capturing capacity of magnesium oxide in FCC operations utilizing feedstocks having a high content of vanadium. References cited above give some indication of past efforts to produce magnesium oxide based vanadium passivating particles adapted for co-circulating with zeolite cracking catalysts. Commercial success has not measured up to the motivation. One primary challenge was to provide a metals passivator in a physical form of particles sufficiently attrition-resistant for use in FCC, while maintaining the magnesium in most reactive form (oxide). Magnesium oxide without a binder/matrix is unsuitable for use in an FCC unit when it must be circulated through the reactor and regenerator of an FCC unit along with cracking catalyst particles. This is because particles of magnesium oxide readily break down into a powder when subjected to attritive forces. Note that in one of the earliest proposals to use magnesia in an FCC unit to combat SOx (U.S. Pat. No. 3,699,037), the material was circulated in the regenerator to bind SOx. The magnesia attrited during such use, eventually to be withdrawn from the regenerator with flue gas without circulating in the cracker, as would be required to achieve vanadium passivation. Because of the friable nature of magnesium oxide particles, the material did not circulate with the catalyst during the FCC cycle.

Numerous patents, including several of those cited above, disclose formulations based on composites of magnesia with kaolin clay. Kaolin clay is a widely used matrix component for cracking catalyst because it is inexpensive and has potential binding properties. Also, it is relatively catalytically inert in calcined form and is a prime candidate as a matrix/diluent for a vanadium passivator based on magnesia, wherein catalytic activity is not desired. An advantage of using kaolin clay as a matrix/diluent is that it can readily be formed into substantially catalytically inert particles by forming a dispersed concentrated fluid slurry feed for spray drying, to form microspheres in a rotary atomizer or nozzle, spray dryer. When dried, especially when calcined at a temperature above the kaolin dehydroxylation temperatures, the calcined kaolin also serves as a binding function.

Several of the references noted above provide examples of MgO/kaolin microspheres prepared by means including spray drying, but they do not disclose the composition of the feed slurry to the spray dryer. They do not provide information about attrition-resistance. There is no indication that the inventors were concerned with attrition-resistance or steam stability of the products. In the case of WO 82/00105, the matrix was a mixture of kaolin and silica-alumina gel, a conventional matrix for zeolite crystals in an active cracking catalyst. Silica-alumina is a material known to possess catalytic activity.

Those skilled in the art of handling kaolin are aware that introduction of magnesium ions into kaolin slurries causes the slurry to flocculate and thicken. This has been used with benefit in the formulation of various clay-based drilling mud. However, flocculation and thickening, especially in short time periods, causes formidable problems in producing magnesia/kaolin products useful for FCC wherein particles of appreciable magnesium oxide content are produced in spray dryers. Slurry instability results in variable particle packing resulting in particle size distribution and particle void volume. Void volume and packing variability is a major root cause in attrition control issues. It is a simple matter to provide a dispersed kaolin slurry that is sufficiently fluid at a high enough concentration (e.g., 50% solids) to produce coherent microspheres. However, if kaolin is spray dried at low solids, e.g., 10%, the microspheres will fall apart before they can be hardened by calcination. If magnesium is added to such a high solids fluid dispersed slurry of kaolin in more than a trace amount, the slurry will flocculate and thicken. If enough magnesium ions are introduced, a solid gel forms and the slurry cannot be formed into microspheres by spray drying using known technology. Addition of magnesium oxide to a kaolin slurry in amount sufficient to produce spray dried particles having a sufficiently high MgO content for effective vanadium passivation will result in a slurry that cannot be spray dried in continuous commercial spray drying equipment. This problem has plagued the pursuit of developing attrition-resistant spray dried microspheres containing magnesia with a clay diluent which meet the criteria for a good vanadium trap: attrition-resistance; high capacity for vanadium trapping; good vanadium passivation; and very high trapping efficiency (i.e., fast vanadium uptake).

To produce such particles it is necessary to overcome the difficulty caused by flocculation of a dispersed slurry of kaolin by the incorporation magnesium ions, resulting in thickening or even gelation of the slurry and, ultimately, the inability to formulate a slurry of sufficiently high solids content to produce attrition-resistant spray dried microspheres. The need to control flocculation and thickening to achieve hardness was counter-balanced by the need to produce microspheres that were sufficiently porous to function as an effective magnesium passivator.

Commonly assigned U.S. Pat. No. 5,300,469, mentioned above, discloses vanadium passivation particles in the form of spray dried attrition-resistant microspheres composed of a minor amount of magnesium oxide, a major amount of calcined kaolin clay admixed therewith and a small amount, relative to the magnesium of oxide, of an in situ formed amorphous magnesium silicate cement. The particles have a low surface area and have minimal cracking activity. Products of the disclosed invention are obtained by processing steps comprising mixing magnesium oxide or magnesium hydroxide, hydrous (uncalcined) kaolin clay and sodium silicate with water to form a dispersed fluid slurry which is aged.

During aging, the basic magnesium compound reacts with sodium silicate to produce magnesium silicate which functions as a binder in the finished product. Optionally colloidal silica, additional kaolin clay or both are added to the aged slurry. The proportion of magnesium oxide relative to sodium silicate is controlled to assure that only a small amount of magnesium silicate is formed, leaving the bulk of the magnesium oxide unreacted and available in the product to passivate metals and, if desired, to bind SOx. The slurry is spray dried to form microspheres which are calcined under conditions sufficiently mild to dehydrate the kaolin while preventing or minimizing the formation of crystalline magnesium silicate and/or magnesium aluminates.

One key manufacturing parameter which the inventors of U.S. Pat. No. 5,300,469 believe is crucial is the avoidance of large amounts of magnesium silicate formation in such a way that only marginal reaction between the two components can take place. Another key parameter is a moderate calcination temperature which avoids the formation of significant amounts of crystalline magnesium silicate and aluminate, thereby preserving the bulk of the MgO throughout the process. A significant amount of crystalline magnesium silicate or aluminate would be a quantity such that more than about half of the magnesium oxide is consumed in forming that crystalline material. Still another key parameter was assuring that the magnesium oxide was well dispersed from the time it was mixed with other ingredients to form a slurry until spray drying. Thus, in order to produce these microspheres in a form sufficiently attrition-resistant for use in FCC involved careful selection of starting materials (MgO, clay and binder) and making a careful selection of slurry preparation procedures prior to spray drying. The patentees stated that magnesium should not be used in the form of magnesium hydroxide or magnesium carbonate, as both give rise to problems due to particle shrinkage, ultimately resulting in vanadium traps having poor attrition resistance.

Despite the best efforts to form an effective magnesium oxide-containing metal trapping particle, which is also attrition resistant and can be readily processed and formed on a commercial scale, problems still persist. Thus, the presence of silicates whether from the kaolin or additional binders, result in reactions with the magnesium oxide to form magnesium silicate, which is not an effective metals trap in refinery applications as magnesium oxide. Moreover, the poor stability of magnesium oxide slurries is still problematic. When aged, such slurries often thicken and gel in 24-48 hours rendering scheduling of production difficult and variable. Also, when the slurry viscosity changes, controlling the final product particle size is challenging which necessitates modifications which add to the cost of the process. Further, magnesium oxide slurries have relatively low solids content, about 20-22% by weight. The low solids content reduces the spray dryer rate and, thus, the productivity of the plant, raises energy consumption and, thus, total product cost. Further, due to the low solids penalty, magnesium oxide levels in the final product may not be as high as desired for effective metals trapping.

SUMMARY OF THE INVENTION

Novel vanadium passivation particles of the present invention are in the form of spray dried attrition-resistant microspheres composed from magnesium oxide, hydrous kaolin and calcium carbonate. In particular, the metal trap particles appear to be a mixed oxide alloy of the magnesium oxide, calcined kaolin and calcium carbonate. The addition of the calcium carbonate appears to greatly reduce the reaction of magnesium and any silicate formed in the types of particles from the kaolin, or formed during processing. The unreacted magnesium oxide or oxide alloy is very effective for metals passivation during FCC.

The product of this invention is obtained by processing steps comprising mixing a magnesium oxide, calcium carbonate and hydrous kaolin. It has been found that the dispersion chemistry for the three components align the zeta potential such that the pH of the mixture does not result in flocculation, and therefore the slurry is stable, has excellent shelf life, has high solid content for microsphere pore volume control and does not require conventional added binder systems for additional attrition resistance. Calcination of the spray dried slurry is carefully controlled to form a mixed metal oxide alloy without formation of excessive magnesium silicate. Temperature control has also been found necessary to control the attrition resistance.

BRIEF DESCRIPTION OF THE DRAWINGS

The FIGURE is the XRD pattern of a calcium-containing mixed oxide alloy trap of this invention.

DETAILED DESCRIPTION OF THE INVENTION

This invention is for an improved metals passivation composition and its use in the catalyst conversion of petroleum oil feeds containing significant levels of metals (Ni—V—Na) in an amount of at least about 0.1 ppm). More particularly, a metal trapping additive containing a mixed metal oxide alloy to immobilize vanadia is provided to reduce the deactivation effect of catalytically active crystalline alumino-silicate zeolites by the metal contaminants in oil feeds—of all types utilized in FCC operations. The invention is particularly useful in the processing of carbo-metallic oil components found in whole crudes, residual oil and reduced crude feeds in a modern fluid catalytic cracking unit.

The novel metals passivation particle of the present invention is a mixed metal alloy formed by the calcination of magnesium oxide, kaolin and calcium carbonate. It is believed that the addition of the calcium carbonate reduces the reaction of the silicate moieties from the kaolin with the magnesium, such that a large portion of the magnesium component is present as magnesium oxide. In fact, an X-ray diffraction (XRD) pattern displaying at least a reflection at a 2-theta peak position at about 43 degrees and about 62 degrees, indicates the presence of magnesium oxide in the periclase crystalline form. What has been found is that greater than 50 wt. % of the magnesium is in the form of the active passivation component, Periclase MgO. The metal trap of this invention can be further optimized to include amounts of Periclase MgO of greater than 60 percent of the magnesium present by varying the composition, such as by increasing the calcium carbonate content in place of the kaolin. Also shown in the XRD are other calcium silicates, calcium aluminates and some amounts of magnesium silicates. By incorporating the calcium carbonate, it is believed that the magnesium silicate content which is unfavorable for metal trapping is reduced.

To form the mixed metal oxide alloy of the present invention, mixed metal alloy metal passivator particles are obtained by spray drying a concentrated (high solids) aqueous slurry of dispersed kaolin, dispersed magnesium oxide or magnesium hydroxide solution, or mixtures thereof and calcium carbonate. The slurry can be aged or spray dried immediately. If a solution of magnesium hydroxide is utilized, it has been found that the aqueous slurry of kaolin, magnesium hydroxide and calcium carbonate is stable and the mixture does not result in flocculation or gelling of the composition. Accordingly, the slurry has excellent shelf life, and the process of spray drying can be easily controlled. Manufacture of the particles can be readily accomplished without the previous difficulties, which were the result of the flocculation and thickening of the aqueous kaolin slurries which contained magnesium oxide. After spray drying, the spray dried microspheres which are formed are then calcined at a time and temperature sufficient to dehydrate the kaolin and harden the particles. It is not necessary to wash the particles to remove solubles. Calcination conditions are controlled to minimize the formation of crystalline magnesium silicates or other crystalline magnesium compounds, such as magnesium aluminates. Thus, the calcined particles of the present invention contain a significant amount of magnesium oxide, shown on XRD and which yields improved passivation of metal components in the hydrocarbon feedstock. In general, the metal passivation particles of the present invention will contain at least about 10% MgO to achieve nominal metals passivation. Amounts of MgO of from 15-30 wt. % in the finished product is particularly useful. Upon calcination, amorphous components are formed, as well as some crystalline metal oxides and metal silicate components that form an in-situ binder or support for the crystalline active magnesium oxide passivation component. It is part of this invention that additional binder components may be added to the mixture of kaolin, magnesium oxide and calcium carbonate. These additional binder materials are well known in the art. For example, sodium silicate can be added in amounts of up to 10 wt. % of the dry mix to act as a binder component. It is preferred that a sodium-type binder not be used, since sodium, especially in amorphous phases are highly mobile in FCC units and contribute to catalyst deactivation. Accordingly, the absence of a sodium silicate binder is preferred.

The composition of the aqueous slurry which is spray dried to form the metal passivation particle of this invention can vary widely. The aqueous slurry which is spray dried will contain 20-90 wt. % kaolin, typically 40-80 wt. % kaolin, 5-50 wt. % magnesium oxide or magnesium hydroxide, typically 10-40 wt. % and 5-50 wt. %, typically 10-40 wt. % calcium carbonate based on the three solid components. The order of addition of the active components to form the aqueous slurry is not critical if magnesium hydroxide instead of magnesium oxide is utilized. If magnesium oxide is added to the slurry, the kaolin and/or magnesium oxide may have to be added in small stages to the slurry.

In general, the kaolin clay which is utilized is a water washed, high purity Georgia hydrous kaolin with particles sizes ranging from 60-90% by weight finer than 2 microns, preferably from 75-80% finer than 2 microns. An improved attrition due to finer calcined clay particles has been found.

The MgO which can be used in the process of this invention has a surface area (Bet, nitrogen) from 1-25 $m^2/g$, with a median particle size of from 1-10 microns. Preferred specifications are 1-10 $m^2/g$ surface area and a median particle size of 4-5 microns. If $Mg(OH)_2$ is utilized, it is commercially available in high solids slurries ranging from 50-60%.

The aqueous slurry containing kaolin, MgO or $Mg(OH)_2$ and calcium carbonate may be spray dried in a conventional spray dryer (wheel or nozzle) and calcined. Typical spray dryer conditions are inlet temperatures of 800 to 1150° F. and outlet temperatures of 190-230° F. Typical bed temperature during calcination is from about 1500-1800° F. Calcination conditions used are sufficient to dehydrate the kaolin, but insufficient to cause characteristic kaolin exotherm to take place. Importantly, it has been found that at lower calcination temperatures of 1500° F.-1600° F., not only are greater amounts of magnesium oxide present in the particle, but vastly improved attrition resistance is achieved relative to particles formed by calcination at 1650° F.-1800° F., subsequent to spray drying.

If magnesium oxide is used to form the slurry, the formation of the slurry of the kaolin, magnesium oxide and calcium carbonate can be accomplished following the procedures as disclosed in U.S. Pat. No. 5,384,041. In such commonly assigned patent, a procedure is disclosed in which the addition of kaolin is staged to control the viscosity of the feed throughout the processing. If magnesium hydroxide is used as a source of the magnesium oxide, staged addition of the kaolin clay is not required inasmuch as flocculation and gelling of the slurry has not been found. In general, the spray dried particles will have an average particle size of 50-150 microns, typically 55-90 microns.

Passivator microspheres of the invention are used to prevent vanadium poisoning of zeolitic cracking catalyst used to crack gas oil and resids. The active cracking catalyst particles contain one or more zeolites, usually including at least one of the Y type, in a matrix/diluent, typically silica-alumina. The catalysts may be prepared by in situ procedures, e.g., processes described in U.S. Pat. No. 4,493,902, or by procedures in which previously crystallized zeolite is mixed with matrix components, e.g., kaolin and silica-alumina gel. Generally particles of zeolitic cracking catalyst and passivator are similar in size, although they can be different if desired.

Passivator microspheres of the invention may be blended with separate zeolite catalyst particles before introducing the catalyst to an FCC unit. Alternatively, the passivator particles can be charged to circulatory catalyst inventory in the cracking unit. Typically the metal passivation particles are mixed in amounts within the range of 2 to 50% by weight, preferably 10 to 40% by weight, and most preferably 20 to 30% by weight of the mixture of cracking catalyst and metal trap particles. When used in insufficient amounts, improvements in vanadium passivation may not be sufficient. When employed in excessive amounts, cracking activity and/or selectivity may be impaired. Optimum proportions vary with the vanadium level of feed and the proportion of magnesia in the passivator particles.

It has long been known that topped crudes, residual oils and reduced crudes with high contaminating metals levels present serious problems as to catalyst deactivation at relatively high metal concentrations on the catalyst, e.g., 5,000-10,000 ppm in combination with elevated regenerator temperatures. Nickel and especially sodium lead to neutralization of the active acidic cracking sites. It has now been particularly recognized that when reduced crude containing feeds with high vanadium to nickel levels are processed over a crystalline zeolite containing catalyst, and especially at high vanadium levels on the catalyst, rapid deactivation of the zeolite can occur. This deactivation manifests itself in substantial measure as a loss of the crystalline zeolitic structure. This loss has been observed at vanadium levels of 1,000 ppm or less. The loss in the crystalline zeolitic structure becomes more rapid and severe with increasing levels of vanadium and at vanadium levels about 5,000 ppm, particularly at levels approaching 10,000 ppm complete destruction of the zeolite structure may occur. Vanadium deactivation at vanadium levels of less than 10,000 ppm can been retarded by increasing the addition rate of virgin catalyst and by lowering regenerator temperatures. Lowering regenerator temperatures has the disadvantage of requiring higher catalyst to oil ratios which increase the amount of coke produced and adversely affect desired product yields. Increasing catalyst addition rates is also costly and can result in an uneconomical operation.

Some crude oils and some FCC charge stocks obtained from the distillation of crude oils contain significant amounts (greater than 0.1 ppm) of heavy metals such as Ni, V, Fe, Cu, Na. Residual oil fractions, and particularly reduced crudes obtained from crude oil distillation operations are prone to have even greater amounts of the metal contaminants. According to the present invention, these high boiling residual oils are converted to liquid transportation and distillate heating fuels by contact with a catalyst composition comprising a crystalline zeolitic catalyst containing a catalytically active zeolite for conversion of the carbo-metallic hydrocarbon components of the feed in combination with a metal passivation additive sufficient to trap metal oxides deposited on the catalyst during hydrocarbon conversion.

The process of the present invention comprises the catalytic cracking of hydrocarbonaceous feedstock using a catalyst composition which comprises a dual particle catalyst system, the first component of which comprises a crystalline aluminosilicate zeolite preferably contained within a matrix material, and the second component of which comprises the mixed metal oxide alloy as described above having an effectiveness for metals passivation. The improvement of the present invention resides in the ability of the catalyst system to function well even when the feedstock contains high levels of metals.

The cracking catalyst component of the novel catalyst composition employed in the process of the present invention can be any cracking catalyst of any desired type having high activity. Preferably, the catalyst used herein is a catalyst containing a crystalline aluminosilicate, preferably exchanged with rare earth metal cations, sometimes referred to as "rare earth-exchanged crystalline aluminum silicate" or one of the stabilized hydrogen zeolites.

Typical zeolites or molecular sieves having cracking activity which can be used herein as a catalytic cracking catalyst are well known in the art. Synthetically prepared zeolites are initially in the form of alkali metal aluminosilicates. The alkali metal ions are typically exchanged with rare earth metal and/or ammonium ions to impart cracking characteristics to the zeolites. The zeolites are crystalline, three-dimensional, stable structures containing a large number of uniform openings or cavities interconnected by smaller, relatively uniform holes or channels. The effective pore size of synthetic zeolites is suitably between 6 and 15 Å in diameter.

Zeolites which can be employed herein include both natural and synthetic zeolites. These zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, ferrierite, and the like. The faujasites are preferred. Suitable synthetic zeolites which can be treated in accordance with this invention include zeolites X, Y, including chemically or hydrothermally dealumintated high silica-alumina Y, A, L, ZK-4, beta, ZSM-types or pentasil boralite and omega. The term "zeolites" as used herein contemplates not only aluminosilicates but substances in which the aluminum is replaced by gallium or boron and substances in which the silicon is replaced by germanium. The preferred zeolites for this invention are the synthetic faujasites of the types Y and X or mixtures thereof.

To obtain good cracking activity the zeolites have to be in a proper form. In most cases this involves reducing the alkali metal content of the zeolite to as low a level as possible. Further, a high alkali metal content reduces the thermal structural stability, and the effective lifetime of the catalyst will be impaired as a consequence thereof. Procedures for removing alkali metals and putting the zeolite in the proper form are well known in the art, for example, as described in U.S. Pat. No. 3,537,816.

The zeolite can be incorporated into a matrix. Suitable matrix materials include the naturally occurring clays, such as kaolin, halloysite and montmorillonite and inorganic oxide gels comprising amorphous catalytic inorganic oxides such as silica, silica-alumina, silica-zirconia, silica-magnesia, alumina-boria, alumina-titania, and the like, and mixtures thereof. Preferably the inorganic oxide gel is a silica-containing gel, more preferably the inorganic oxide gel is an amorphous silica-alumina component, such as a conventional silica-alumina cracking catalyst, several types and compositions of which are commercially available. These materials are generally prepared as a co-gel of silica and alumina, co-precipitated silica-alumina, or as alumina precipitated on a pre-formed and pre-aged hydrogel. In general, silica is present as the major component in the catalytic solids present in such gels, being present in amounts ranging between about 55 and 100 weight percent. The matrix component may suitably be present in the catalyst of the present invention in an amount ranging from about 40 to about 92 weight percent, preferably from about 60 to about 80 weight percent, based on the total catalyst.

U.S. Pat. No. 4,493,902, the teachings of which are incorporated herein by cross-reference, discloses novel fluid cracking catalysts comprising attrition-resistant, high zeolitic content, catalytically active microspheres containing more than about 40%, preferably 50-70% by weight Y faujasite and methods for making such catalysts by crystallizing more than about 40% sodium Y zeolite in porous microspheres composed of a mixture of two different forms of chemically reactive calcined clay, namely, metakaolin (kaolin calcined to undergo a strong endothermic reaction associated with dehydroxylation) and kaolin clay calcined under conditions more severe than those used to convert kaolin to metakaolin, i.e., kaolin clay calcined to undergo the characteristic kaolin exothermic reaction, sometimes referred to as the spinel form of calcined kaolin. In a preferred embodiment, the microspheres containing the two forms of calcined kaolin clay are immersed in an alkaline sodium silicate solution, which is heated, preferably until the maximum obtainable amount of Y faujasite is crystallized in the microspheres.

In practice of the '902 technology, the porous microspheres in which the zeolite is crystallized are preferably prepared by forming an aqueous slurry of powdered raw (hydrated) kaolin clay ($Al_2O_3:2SiO_2:2H_2O$) and powdered calcined kaolin clay that has undergone the exotherm together with a minor amount of sodium silicate which acts as fluidizing agent for the slurry that is charged to a spray dryer to form microspheres and then functions to provide physical integrity to the components of the spray dried microspheres. The spray dried microspheres containing a mixture of hydrated kaolin clay and kaolin calcined to undergo the exotherm are then calcined under controlled conditions, less severe than those required to cause kaolin to undergo the exotherm, in order to dehydrate the hydrated kaolin clay portion of the microspheres and to effect its conversion into metakaolin, this resulting in microspheres containing the desired mixture of metakaolin, kaolin calcined to undergo the exotherm and sodium silicate binder. In illustrative examples of the '902 patent, about equal weights of hydrated clay and spinel are present in the spray dryer feed and the resulting calcined microspheres contain somewhat more clay that has undergone the exotherm than metakaolin. The '902 patent teaches that the calcined microspheres comprise about 30-60% by weight metakaolin and about 40-70% by weight kaolin characterized through its characteristic exotherm. A less preferred method described in the patent, involves spray drying a slurry containing a mixture of kaolin clay previously calcined to metakaolin condition and kaolin calcined to undergo the exotherm but without including any hydrated kaolin in the slurry, thus providing microspheres containing both metakaolin and kaolin calcined to undergo the exotherm directly, without calcining to convert hydrated kaolin to metakaolin.

In carrying out the invention described in the '902 patent, the microspheres composed of kaolin calcined to undergo the exotherm and metakaolin are reacted with a caustic enriched sodium silicate solution in the presence of a crystallization initiator (seeds) to convert silica and alumina in the microspheres into synthetic sodium faujasite (zeolite Y). The microspheres are separated from the sodium silicate mother liquor, ion-exchanged with rare earth, ammonium ions or both to form rare earth or various known stabilized forms of catalysts. The technology of the '902 patent provides means for achieving a desirable and unique combination of high zeolite content associated with high activity, good selectivity and thermal stability, as well as attrition-resistance.

The aforementioned technology has met widespread commercial success. Because of the availability of high zeolite content microspheres which are also attrition-resistant, custom designed catalysts are now available to oil refineries with specific performance goals, such as improved activity and/or selectivity without incurring costly mechanical redesigns. A significant portion of the FCC catalysts presently supplied to domestic and foreign oil refiners is based on this technology. Refineries whose FCC units are limited by the maximum tolerable regenerator temperature or by air blower capacity seek selectivity improvements resulting in reductions in coke make while the gas compressor limitations make catalysts that reduce gas make highly desirable. Seemingly a small reduction in coke can represent a significant economic benefit to the operation of an FCC unit with air blower or regenerator temperature limitations.

The method of forming the final composited catalyst forms no part of this invention, and any method well known to those skilled in this art, such as described above is acceptable.

Suitable charge stocks for use with the present invention include crude petroleum, atmospheric or vacuum residua, deasphalted oils from such feedstocks, shale oil, liquefied coal, and tar sand effluent or other petroleums fractions which are suitable catalytic cracking charge stocks except for the high metals contents.

It is to be understood that the catalyst compositions described above can be used in the catalytic cracking of any hydrocarbon charge stock containing metals, but is particularly useful for the treatment of high metals content charge stocks. Typical feedstocks are heavy gas oils or the heavier fractions of crude oil in which the metal contaminants are concentrated. Particularly preferred charge stocks for treatment using the catalyst composition of this invention include deasphalted oils boiling above about 900° F. (482° C.) at atmospheric pressure; heavy gas oils boiling from about 600° F. to about 1100° F. (343° C. to 593° C.) at atmospheric pressure; atmospheric or vacuum tower bottoms boiling above about 650° F.

The relative amounts of the catalytically active and metal passivation component introduced into the system as make-up can be adjusted so as to increase the concentration of the metal traps in the riser and in the system as the concentration of metal contaminants in the cracking zone increases. Accordingly, with the metal traps acting as a scavenger for the metal contaminants, preventing such contaminants from reaching the cracking centers of the catalytically active component, the concentration of the traps in the make-up catalyst can be adjusted so as to maintain a desired conversion, preferably a conversion of at least 55 percent. The concentration of the traps component in the cracking zone can be adjusted so as to maintain a conversion of at least 55 percent when the cracking catalyst composite (cracking component plus traps) contains combined nickel, vanadium and iron contaminant concentrations in the range of 4000 to 20,000 ppm total metals (based upon the weight of the catalyst composite). The trap is particularly effective in the scavenging of vanadium. It may also be advantageous to include other known metals passivators to further reduce the deleterious effects of the metals contaminants. Examples would include antimony oxide or bismuth oxide, in addition to the magnesium and calcium/magnesium compounds.

The reaction temperature in accordance with the above described process is at least about 900° F. (482° C.). The upper limit can be about 1100° F. (593.3° C.) or more. The preferred temperature range is about 950° F. to about 1050° F. (510° C. to 565.6° C.). The reaction total pressure can vary widely and can be, for example, about 5 to about 50 psig (0.34 to 3.4 atmospheres), or preferably, about 20 to about 30 psig (1.36 to 2.04 atmospheres). The maximum residence time is about 5 seconds, and for most charge stocks the residence time will be about 1.0 to about 2.5 seconds or less. For high molecular weight charge stocks, which are rich in aromatics, residence times of about 0.5 to about 1.5 seconds are suitable in order to crack mono- and di-aromatics and naphthenes which are the aromatics which crack most easily and which produce the highest gasoline yield, but to terminate the operation before appreciable cracking of polyaromatics occurs because these materials produce high yields of coke and $C_2$ and lighter gases. The length to diameter ratio of the reactor can vary widely, but the reactor should be elongated to provide a high linear velocity, such as about 25 to about 75 feet per second; and to this end a length to diameter ratio above about 20 to about 25 is suitable. The reactor can have a uniform diameter or can be provided with a continuous taper or a stepwise increase in diameter along the reaction path to maintain a nearly constant velocity along the flow path.

The weight ratio of catalyst to hydrocarbon in the feed is varied to affect variations in reactor temperature. Furthermore, the higher the temperature of the regenerated catalyst, the less catalyst is required to achieve a given reaction temperature. Therefore, a high regenerated catalyst temperature will permit the very low reactor density level set forth below and thereby help to avoid backmixing in the reactor. Generally catalyst regeneration can occur at an elevated temperature of about 1250° F. (676.6° C.) or more. Carbon-on-catalyst of the regenerated catalyst is reduced from about 0.6 to about 1.5, to a level of about 0.3 percent by weight. At usual catalyst to oil ratios, the quantity of catalyst is more than ample to achieve the desired catalytic effect and therefore if the temperature of the catalyst is high, the ratio can be safely decreased without impairing conversion. Since zeolitic catalysts, for example, are particularly sensitive to the carbon level on the catalyst, regeneration advantageously occurs at elevated temperatures in order to lower the carbon level on the catalyst to the stated range or lower. Moreover, since a prime function of the catalyst is to contribute heat to the reactor, for any given desired reactor temperature the higher the temperature of the catalyst charge, the less catalyst is required. The lower the catalyst charge rate, the lower the density of the material in the reactor. As stated, low reactor densities help to avoid backmixing.

Example 1

A metal trap, according to this invention, was prepared by mixing a magnesium oxide slurry with slurries of calcium carbonate and kaolin as follows:

A magnesium oxide slurry was prepared at 20-22% solids and was added in a reslurry operation to the desired analytical content.

A commercial calcium carbonate slurry at 75% (Hydrocarb 60) sold by Omya North America, Procter, Vt., which is a ground calcium carbonate was used.

The kaolin slurry was prepared at 55% solids.

The three slurries were mixed at existing solids using a reslurry system similar to a Cowles or other suitable high shear device. The Magnesium Oxide and water were added to achieve total solids >40% up to 50%. The samples were prepared to contain approximately 15% calcium and magnesium by weight and 70% kaolin when dehydroxylated. The purpose of the experiment was to determine the relationship of calcination temperature, physical properties, and zeolite retention when varying calcination conditions. The starting point was with equal weight contribution of calcium and magnesium.

The spray dried product (Niro atomizer design dryer) was a mixture of the following using a dry weight basis (per 100 dry grams of calcined product):

15% calcium—calcium carbonate—33 grams dry basis moisture balance testing to determine solids 15% magnesium—magnesium oxide—25 grams delivered basis (100% by LOI)

70% calcined kaolin—hydrous kaolin—82 dry grams (allowing ~15% dehydroxylation losses)

Sodium silicate N Brand (3.22 modulus) was added at approximately 2% binder level on silica basis.

XRF of primary constituents in the calcined product—oxide basis %

Iron—0.69
Calcium—16.2
Silica—35.32
Alumina—17.3
Magnesium—17.3
Sodium—0.7
Titanium—1.1
(trace amounts of other material not included)

The product was calcined in a laboratory muffle furnace at 1950° F. to convert all of the kaolin to spinel. The roller attrition resistance=1, which was very low.

The product was calcined at 1800° F. and the roller remained uncharacteristically low at 2.

Further calcinations were conducted and the results are shown below.

|  | Attrition |
| --- | --- |
| 1800° F. | roller = 2 |
| 1650° F. | roller = 4 |
| 1550° F. | roller = 6 |
| 1500° F. | roller = 20 |

Example 2

Samples 1-4 were prepared by blending the calcium carbonate into the kaolin or kaolin mixture and then adding the magnesium hydroxide. Slurry solids are maintained at 50% solids by weight or higher.

1. Control
   a. $Mg(OH)_2$—5.8 dry pounds
   b. Kaolin—18.6 dry pounds
   c. 10.0 pounds of calcium carbonate.
   a. $Mg(OH)_2$—5.8 dry pounds
   b. Kaolin—15.8 dry pounds
   c. Ansilex 93®-2.4 dry pounds
   d. 10.0 pounds of calcium carbonate
     1. Ansilex is a fine fully calcined kaolin.
   a. $Mg(OH)_2$—5.8 dry pounds
   b. Kaolin—13.0 dry pounds
   c. Ansilex 93-4.8 dry pounds
   d. 10.0 pounds of calcium carbonate.
   a. $Mg(OH)_2$—5.8 dry pounds
   b. Kaolin—10.3 dry pounds
   c. Ansilex 93-7.2 dry pounds
   d. 10.0 pounds of calcium carbonate.

|  |  | Sample 1 | | Sample 2 | | Sample 3 | | Sample 4 | |
| --- | --- | --- | --- | --- | --- | --- | --- | --- | --- |
| Calcination Temp. | | 1650 F. | 1750 F. | 1650 F. | 1750 F. | 1650 F. | 1750 F. | 1650 F. | 1750 F. |
| Average Particle Size (microns) | | 72.30 | 73.12 | 80.37 | 79.92 | 76.71 | 74.86 | 82.31 | 81.60 |
| % less than | 105 m | 84.34 | 89.98 | 80.06 | 78.62 | 83.32 | 84.07 | 75.90 | 75.48 |
|  | 80 | 60.50 | 60.90 | 49.48 | 50.11 | 54.63 | 57.11 | 47.02 | 48.02 |
|  | 60 | 30.55 | 25.47 | 19.71 | 20.29 | 23.84 | 25.49 | 18.43 | 20.68 |
|  | 40 | 6.35 | 2.48 | 3.42 | 3.30 | 0.19 | 0.33 | 0.23 | 0.18 |
|  | 20 | 0.18 | 0.06 | 0.15 | 0.18 | 9.7 | 8.1 | 8.6 | 7.7 |
| MgO % | | 9.7 | 7.7 | 10.1 | 8.0 | 9.7 | 8.1 | 8.6 | 7.7 |
| Mullite % | | 3.2 | 7.2 | 2.6 | 7.3 | 3.1 | 6.4 | 3.5 | 5.4 |
| ABD | | 0.86 | 0.89 | 0.77 | 0.82 | 0.73 | 0.73 | 0.62 | 0.63 |
| Roller | | 7.1 |  | 9.9 | 7.2 |  |  |  | 36.0 |

Example 3

A stability study was conducted on the following: all samples were mixed in a pilot plant scale Cowles mixer.

|  | Solids | pH | BF |
| --- | --- | --- | --- |
| Kaolin | 59.55% | 9.8 |  |
| Hydrocarb 90 | 76.68% | 9.2 | 425 |
| AquaMag[1] - Magnesium Hydroxide | 55.19% | 11.3 | 1740 |

[1]Manufactured by Omya

-continued

Blend 1500 dry grams

| order | ratio | dry wt.(g) | wet wt.(g) |
|---|---|---|---|
| 1 AquaMag | 23.0% | 345 | 625.1 |
| 2 Hyd 90 | 24.0% | 360 | 469.5 |
| 3 Kaolin | 53.0% | 795 | 1335.0 |

| | Brookfield Viscosity (cps) | Solids | pH |
|---|---|---|---|
| Initial | 800 | 54.95% | 10.3 |
| 4 hours ↓ | 1560 | 55.30% | |

At 4 hours, was added to a portion of sample (2.0% 3.22 modulus sodium silicate)

| | Brookfield Viscosity (cps) | Solids |
|---|---|---|
| initial | 35 | 55.30% |
| 24 hours | 35 | 55.89% |
| 48 hours | 35 | 56.64% |
| 24 hours | 5100 | 56.30% |
| 48 hours ↓ | 16,000 | 57.80% |

At 48 hours .5% silicate was added to a portion of the sample 306 dry grams × 0.5% = 1.53 gms (3.22 modulus sodium slicate)

| | Brookfield Viscosity (cps) | Solids | pH |
|---|---|---|---|
| Initial | 50 | 57.80% | |
| 24 hours | 165 | 59.61% | 11.35 |

Blend 750 dry grams

| | |
|---|---|
| 1 AquaMag | 23.0% |
| 2 Hyd 90 | 24.0% |
| 3 Kaolin | 53.0% |

1. Added 0.5% 3.22 sodium silicate to kaolin, based on total dry grams of blend 750 × 0.5% = 3.75 gms 3.22 sodium silicate
2. Blended AquaMag/Hydro 90
3. Added kaolin

| | Brookfield Viscosity (cps) | Solids | pH |
|---|---|---|---|
| Initial | 35 | 54.92% | |
| 24 hours | 40 | 58.10% | 11.6 |

Example 4

The product of Example 3 was studied under XRD using the following procedure. Instrumentation:

A PANalytical MPD X'Pert Pro diffraction system was used to collect data. $CU_{K\alpha}$ radiation was used in the analysis with generator settings of 45 kV and 40 mA. The optical path consisted of a ¼° divergence slit, 0.04 radian soller slits, 15 mm mask, ½° anti-scatter slits, the sample, 0.04 radian soller slits, Ni filter, and an X'Celerator position sensitive detector.

The samples were first prepared by grinding in a mortar and pestle and then backpacking the sample into a round mount. The data collection from the round mount covered a range from 3° to 80° 2θ using a step scan with a step size of 0.016° 2θ and a count time of 120 s per step.

Methodology & Calculations:

Jade Plus 9 analytical X-ray diffraction software was used for all steps of the data analysis. The phases present in each sample were identified by search/match of the PDF-4/Full File database from ICDD, which is the International Center for Diffraction Data.

The XRD diffraction pattern in shown in FIG. 1.

The invention claimed is:

1. A metal trap particle used to passivate metals during FCC processing comprising a spray dried mixture of kaolin, magnesium oxide or magnesium hydroxide, and calcium carbonate, said spray dried mixture having been calcined at a temperature of from 1500° F. to less than 1650° F.

2. The metal trap particle of claim 1, wherein said spray dried mixture is calcined at 1500° F.

3. The metal trap particle of claim 1, wherein said spray dried mixture comprises 20-90% wt. % kaolin, 5-50 wt. % magnesium oxide or magnesium hydroxide and 5-50 wt. % calcium carbonate.

4. The metal trap particle of claim 3, wherein said spray dried mixture comprises 40-80 wt. % kaolin, 10-40 wt. % magnesium oxide or magnesium hydroxide and 10-40 wt. % calcium carbonate.

5. The metal trap particle of claim 1, wherein said spray dried mixture contains magnesium hydroxide.

6. The metal trap particle of claim 1, wherein the calcined spray dried mixture contains at least about 10% magnesium oxide.

7. The metal trap particle of claim 6, wherein the calcined spray dried mixture contains 15-30 wt. % magnesium oxide.

8. The metal trap particle of claim 1, wherein the calcined spray dried mixture contains greater than 50% of the magnesium in the form of Periclase MgO.

9. The metal trap particle of claim 1, wherein the calcined spray dried mixture has an average particle size of 50-150 microns.

10. The metal trap particle of claim 1, wherein kaolin comprises a mixture of hydrous kaolin and calcined kaolin.

11. A method of metal passivation during fluid catalytic cracking (FCC) comprising:
    (a) contacting a metal-containing hydrocarbon fluid stream in an FCC unit comprising a mixture of a fluid catalytic cracking catalyst and a particulate metal trap;
    (b) said particulate metal trap comprising a spray dried mixture of kaolin, magnesium oxide or magnesium hydroxide, and calcium carbonate, said spray dried mixture being calcined at a temperature of 1500° F. to less than 1650° F. and wherein said metal trap contains at least 10 wt. % magnesium oxide.

12. The method of claim 11, wherein said spray dried particle is calcined at 1500° F.

13. The method of claim 11, wherein said spray dried mixture comprises 30-90% wt. % kaolin, 5-50 wt. % magnesium oxide or magnesium hydroxide and 5-50 wt. % calcium carbonate.

14. The method of claim 13, wherein said spray dried mixture comprises 40-80 wt. % kaolin, 10-40 wt. % magnesium oxide or magnesium hydroxide and 10-40 wt. % calcium carbonate.

15. The method of claim 11, wherein said spray dried mixture contains magnesium hydroxide.

16. The method of claim 11, wherein said calcined spray dried mixture contains 15-30 wt. % magnesium oxide.

17. The method of claim 11, wherein said calcined spray dried mixture has an average particle size of 50-150 microns.

18. The method of claim 11, wherein the calcined spray dried mixture contains greater than 50 percent of the magnesium in the form of Periclase MgO.

19. The method of claim 11, wherein kaolin comprises a mixture of hydrous kaolin and calcined kaolin.

20. The method of claim 11, wherein said metal trap comprises 2 to 50% by weight of said mixture of said cracking catalyst and said trap.

* * * * *

UNITED STATES PATENT AND TRADEMARK OFFICE
CERTIFICATE OF CORRECTION

PATENT NO. : 8,372,269 B2
APPLICATION NO. : 12/572777
DATED : February 12, 2013
INVENTOR(S) : Mitchell James Willis et al.

It is certified that error appears in the above-identified patent and that said Letters Patent is hereby corrected as shown below:

In the Specifications

Column 16, line 31, should read:
11. A method of metal passivation during fluid catalytic (FCC) comprising:
(a) contacting a metal-containing hydrocarbon fluid stream in an FCC unit comprising a mixture of a fluid catalytic cracking catalyst and a particulate metal trap;
(b) said particulate metal trap comprising a spray dried mixture of kaolin, magnesium oxide or magnesium hydroxide, and calcium carbonate, said spray dried mixture being calcined at a temperature of 1500 °F to less than 1650 °F and wherein said calcined metal trap contains at least 10 wt.% magnesium oxide.

Column 16, line 44, should read:
13. The method of claim 11, wherein said spray dried mixture comprises 30-90[%] wt.% kaolin, 10[5]-50 wt.% magnesium oxide or magnesium hydroxide and 50-50 wt.% calcium carbonate.

Column 16, line 51, delete
"15. The method of claim 11, wherein said spray dried mixture contains magnesium hydroxide."

Signed and Sealed this
Thirtieth Day of April, 2013

Teresa Stanek Rea
*Acting Director of the United States Patent and Trademark Office*